US 11,209,805 B2

(12) United States Patent
Chai et al.

(10) Patent No.: US 11,209,805 B2
(45) Date of Patent: Dec. 28, 2021

(54) MACHINE LEARNING SYSTEM FOR ADJUSTING OPERATIONAL CHARACTERISTICS OF A COMPUTING SYSTEM BASED UPON HID ACTIVITY

(71) Applicant: MICROSOFT TECHNOLOGY LICENSING, LLC, Redmond, WA (US)

(72) Inventors: Xiaoyu Chai, Issaquah, WA (US); Choo Yei Chong, Redmond, WA (US); Ioana Laura Marginas, Bellevue, WA (US); Eleanor Ann Robinson, Sammamish, WA (US); Dale R. Johnson, Sammamish, WA (US); Xinyi Zhang, Issaquah, WA (US); Xiao Cai, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 1076 days.

(21) Appl. No.: 15/799,864

(22) Filed: Oct. 31, 2017

(65) Prior Publication Data
US 2019/0129401 A1    May 2, 2019

(51) Int. Cl.
*G05B 23/02* (2006.01)
*G06F 9/30* (2018.01)
(Continued)

(52) U.S. Cl.
CPC ..... *G05B 23/0216* (2013.01); *G06F 9/30029* (2013.01); *G06F 9/44505* (2013.01);
(Continued)

(58) Field of Classification Search
None
See application file for complete search history.

(56) References Cited

U.S. PATENT DOCUMENTS 9,330,257 B2 * 5/2016 Valencia .............. G06F 21/552
2010/0332876 A1 * 12/2010 Fields, Jr. ............ G06F 9/5094
713/323

(Continued)

OTHER PUBLICATIONS

"International Search Report and Written Opinion Issued in PCT Application No. PCT/US2018/013721", dated Jul. 17, 2018, 10 Pages.

(Continued)

*Primary Examiner* — Alan Chen

(57) ABSTRACT

Technologies are described for utilizing machine learning ("ML") to adjust operational characteristics of a computing system based upon detected HID activity. Labeled training data is collected with user consent that includes data describing HID activity and data that identifies user activity taking place on a computing device when the data HID activity took place. A ML model is trained using the labeled training data that can receive data describing current HID activity and identify user activity currently taking place on another computing device based upon the current HID activity. The ML model can then select features of the other computing device that are beneficial to the identified user activity. The ML model can then cause one or more operational characteristics of the other computing device to be adjusted based upon the identified user activity, thereby saving valuable computing resources. A UI can also be presented that describes the identified features.

18 Claims, 9 Drawing Sheets

(51) Int. Cl.
  *G06N 20/00* (2019.01)
  *G06F 16/2457* (2019.01)
  *G06F 9/451* (2018.01)
  *G06F 9/445* (2018.01)

(52) U.S. Cl.
  CPC .......... *G06F 9/453* (2018.02); *G06F 16/2457* (2019.01); *G06N 20/00* (2019.01)

(56) References Cited

U.S. PATENT DOCUMENTS

| | | | |
|---|---|---|---|
| 2016/0110649 A1* | 4/2016 | Dong | H04W 4/50 706/11 |
| 2017/0032138 A1 | 2/2017 | Navda et al. | |
| 2017/0083352 A1 | 3/2017 | Chiou et al. | |
| 2017/0118715 A1* | 4/2017 | Bhattacharya | H04W 52/0277 |
| 2017/0371394 A1* | 12/2017 | Chan | G06F 1/3218 |
| 2018/0247241 A1* | 8/2018 | Avrahami | G06Q 10/06313 |
| 2018/0293697 A1* | 10/2018 | Ray | G06F 9/30145 |
| 2019/0205839 A1* | 7/2019 | Dotan-Cohen | G06Q 10/1093 |

OTHER PUBLICATIONS

Poyarkov, et al., "Boosted Decision Tree Regression Adjustment for Variance Reduction in Online Controlled Experiments", In Proceedings of the 22nd ACM SIGKDD International Conference on Knowledge Discovery and Data Mining, Aug. 13, 2016, pp. 235-244.

* cited by examiner

MACHINE LEARNING SYSTEM FOR ADJUSTING OPERATIONAL CHARACTERISTICS OF A COMPUTING SYSTEM BASED UPON HID ACTIVITY

BACKGROUND

Modern computer operating systems are incredibly feature-rich, with additional features being added in every new release. In fact, some operating systems include so many features that it is difficult for users to discover features that might be of use to them and allow them to operate their computing systems more efficiently. Moreover, the large number of features present in modern operating systems can also make it difficult for users to discover features of operating systems that can improve operational performance of their computing systems. As a result, some computing systems operate less efficiently than they could, thereby wasting computing resources like processor cycles, memory, and power.

Some operating systems provide video tutorials to users that describe some of the available features. It is not uncommon, however, for users to skip these tutorials. Moreover, given the large number of features available in current operating systems, it would be very difficult to describe all the available features in a reasonably long tutorial. As a result, users commonly do not discover operating system features that would enable more efficient use of their computing systems or enable the computing systems to operate more efficiently.

It is with respect to these and other considerations that the disclosure made herein is presented.

SUMMARY

Technologies are described herein for utilizing machine learning ("ML") to adjust operational characteristics of a computing system based upon Human Interface Device ("HID") activity. Through an implementation of the technologies disclosed herein, data describing a user's HID activity ("HID activity data"), such as data identifying keyboard or mouse activity, can be obtained and utilized to train a ML model capable of identifying a user activity taking place on a computing device based upon the HID activity.

The ML model can be deployed and utilized to detect the current activity that a user is engaged in on a computing device. Operating system ("OS") features of interest, and OS features that can improve operational characteristics of a computing device, can be identified based upon the detected user activity and information describing the features can be presented to the user.

Operational characteristics of a computing system can also be automatically adjusted based upon the detected user activity, thereby allowing the computing system to operate more efficiently and conserve valuable computing resources. Other technical benefits not specifically identified herein can also be realized through implementations of the disclosed technologies.

According to one implementation of the disclosed technologies, labeled training data is collected with user consent that includes data describing HID activity observed at a computing device, such as keyboard or mouse activity. The HID activity data is represented as Boolean data in some configurations. For instance, the data describing the HID activity might specify a '0' if a keyboard was not used during a particular time period (e.g. 1 second) and specify a '1' if a keyboard was used during the time period. The labeled training data can also provide timestamps that indicate the time at which the HID activity data was collected and, potentially, other types of data. The labeled training data does not, however, include any personally identifiable information ("PII") for users participating in the collection of the labeled training data.

The labeled training data also includes data that identifies the user activity taking place on the computing device when the HID activity data was obtained. For example, and without limitation, the labeled training data might indicate that a user was utilizing a productivity application, a streaming video application, or an email application at the time the HID activity was observed. The labeled training data might also indicate that a user was utilizing a particular application program, productivity experience, entertainment experience, or another type of experience.

In one configuration, an application collects this data with explicit user consent. In this manner, HID activity can be correlated to the user activity taking place on a computing device when the HID activity data was collected. For example, and without limitation the training data can be collected by an application program that receives the HID activity data and receives user input specifying the current user activity. Labeled training data can be collected from a large number of computing devices in a similar manner.

Once the labeled training data has been collected, a ML model can be trained using the labeled training data. For example, and without limitation, an ML model is trained using Boosted Decision Trees in one particular configuration. Other ML techniques can also be utilized to train the ML model. By training the ML model using the labeled training data, the ML model can be configured to receive data describing HID activity and to identify activity taking place on a computing device based upon the HID activity data. Once trained, the ML model can be deployed to other computing systems.

Following deployment, the ML model can receive HID activity data for a computing device (e.g. data describing the activity of a keyboard or mouse) and identify a user activity currently taking place on the computing device based upon the user HID activity. For example, and without limitation, the ML model might conclude that a user is utilizing an email website or application based solely on the HID activity observed at the user's computing device.

The ML model can then identify one or more features of the computing device, such as features provided by an OS executing on the computing device, that are beneficial to the identified user activity. Beneficial features include, but are not limited to, features that improve the performance of the user's computing device, improve the user interface provided by the computing device, enable the computing device to provide additional features, allow a user to work more efficiently or accurately, or that provide other types of benefits to the operation of the computing device. In some configurations, the ML model can then cause a user interface ("UI") to be presented by the computing device that describes the identified feature, or features, to a user of the computing device. In some configurations, the ML model can cause one or more operational characteristics of the computing device to be adjusted based upon the identified activity, thereby saving computing resources.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
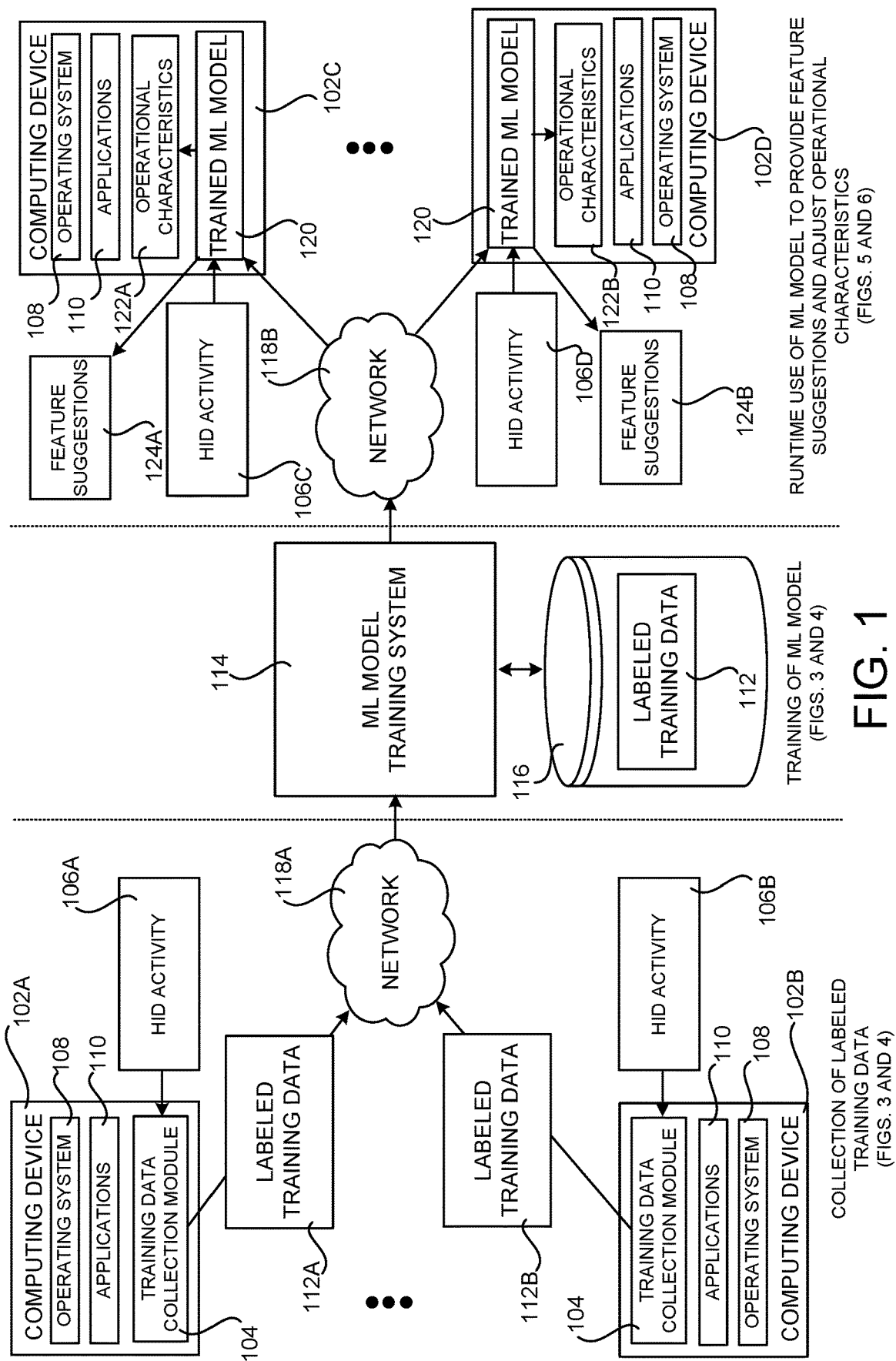
FIG. 1 is a network architecture diagram showing an overview of a system for utilizing ML to adjust operational characteristics of a computing device based upon HID activity, according to one particular configuration.

The following detailed description is directed to technologies for utilizing ML to adjust operational characteristics of a computing system based upon HID activity. As discussed briefly above, implementations of the technologies disclosed herein can reduce the utilization of processor cycles, memory, network bandwidth, and other computing resources. Other technical benefits can also be realized through an implementation of the technologies disclosed herein.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for utilizing ML to adjust operational characteristics of a computing system based upon HID activity will be described.

Prior to discussing FIG. 1, it is to be noted that various components in the configurations described below can collect and utilize data describing HID activity at a computing system, data describing user activity taking place on a computing system, or data describing other aspects of the operation of a computing system. In all configurations disclosed herein, users are explicitly informed of the type of data that will be collected. Users must also expressly consent to the collection of such data following the disclosure of the data collection and prior to the actual data collection taking place. Moreover, no personally identifiable information ("PII") is collected from users in any configuration disclosed herein.

FIG. 1 is a network architecture diagram showing an overview of a system for utilizing ML to adjust operational characteristics of a computing device based upon HID activity, according to one particular configuration. As illustrated in FIG. 1, a number of computing devices 102, such as the computing devices 102A and 102B shown in FIG. 1, are configured to execute a training data collection module 104 (which might be referred to herein as "the module 104").

The module 104 executes on a computing device 102 and collects data ("HID activity data") that describes the activity of HIDs connected to the computing device (such as HID activity 106A and 106B in FIG. 1). HIDs include, but are not limited to, keyboards, mice, touchpads, trackballs, touch screens, joysticks, image processing and gesture recognition devices, and voice input devices. Other types of HIDs not specifically mentioned herein can also be utilized with the technologies disclosed herein.

In one configuration, the HID activity 106 is observed by an operating system 108 in connection with power management functions (e.g. putting a computing device to sleep if no user input has been received for a period of time). Data describing the HID activity 106 is then exposed to other components for other uses, such as applications 110 and the module 104.

It is to be appreciated that the HID activity data can be collected by other components in other ways in other configurations. For example, and without limitation, an application 110 or the operation system 108 collects HID activity data in some configurations.

In one configuration, the HID activity data is formatted as Boolean data. For instance, data describing the HID activity 106 might specify a '0' if a keyboard was not used during a particular time period (e.g. 1 second) and specify a '1' if a keyboard was used during the time period. The operating system 108 can also provide timestamps (not shown in FIG. 1) indicating the time period during which the HID activity 106 took place. In some configurations, the Boolean data can be aggregated as counts.

In another configuration, the HID activity data describes a relative amount of HID activity 106 during a time period. For example, and without limitation, HID activity data might indicate that no HID activity 106 took place during a period of time, that some level of HID activity 106 took place during the period of time, or that a high amount of HID activity 106 took place during the period of time. In this regard, it is to be appreciated that the HID activity data can describe the HID activity 106 taking place during a particular time period in other ways in other configurations.

It is also to be appreciated that the HID activity data does not identify the actual user input made through the HID devices (e.g. the keys typed on a keyboard or the movement of a mouse) or the actual user activity taking place on the computing device 102. Rather, the HID activity data indicates only that HID activity 106 took place at a computing device 102 during a period of time or, as discussed above, might indicate the level of HID activity 106 that took place during the period of time (e.g. none, medium, high).

The module 104 can also collect data identifying user activity ("user activity data") taking place on a computing device 102 at the time the HID activity 106 was observed. For example, and without limitation, the module 104 can collect data indicating that a user of a computing device 102 was utilizing a productivity website or application, a streaming video website or application, or an email website or application at the time the HID activity was observed. The user activity data can also indicate the amount of user activity or usage over time.

The user activity data can also identify other types of user activities including, but not limited to, the time of day that user activity was observed, the identity of applications executing on the computing device 102, whether an application was in the foreground or background, data indicating whether an application 108 had UI focus, that an application 108 lost UI focus, a new process count, the duration that a user has been active or engaged, the state of UI windows, the amount of computing resources (e.g. processor cycles, network bandwidth, and memory usage) in use by the computing system 102 at the time the HID activity data was collected, data indicating that a device was plugged into the computing system 102 (e.g. speakers or a monitor), or data describing how the user responded to previous ML-based suggestion or adjustments (e.g. if the user accepted a suggested change or otherwise responded positively, the user didn't do anything, or the user rejected the change or dismissed an ML-generated notification). Data describing other types of activity at the computing device 102 can be obtained in other configurations.

In some configurations, the module 104 is a plug-in to a web browser application that collects the data described above. It is to be appreciated, however, that the functionality described herein as being provided by the module 104 can be implemented by other components in other configurations, such as within applications 110 or within the OS 108.

Because some or all of the data collected by the module 104 is utilized to train a ML model 120, this data might be referred to herein as "labeled training data 112," such as the labeled training data 112A and 112B shown in FIG. 1. In particular, the labeled training data 112 can include, but is not limited to, HID activity data, timestamps indicating the time at which the HID activity data was collected and user activity data describing user activity at a computing device 102 at the time the HID activity data was collected.

The data describing the user activity at a computing device 102 can be considered a label for the HID activity data. Labeled training data 112 can be collected in the manner described above from a large number of computing devices 102 in a similar manner, or collected in other ways. Additional details regarding the collection of the labeled training data 112 will be provided below with regard to FIGS. 3 and 4.

As illustrated in FIG. 1, the computing devices 102 can provide the labeled training data 112 to a ML model training system 114 by way of a network 118A, such as the internet. The ML model training system 114 can store the labeled training data 112 in an appropriate data store 116. The ML model training system 114 can then utilize the labeled training data 112 to train a ML model 120 (which might be referred to herein as the "trained ML model 120" or simply the "model 120"). The ML model training system 114 trains the ML model 120 using Boosted Decision Trees in one particular configuration. Other ML techniques can also be utilized to train the ML model 120 in other configurations.

As will be described in greater detail below, by training the ML model 120 using the labeled training data 112, the ML model 120 can be configured to receive data describing HID activity 106 taking place on a computing device 102, such as the HID activity 106C and 106D taking place at the computing devices 102C and 102D, respectively, and to identify user activity taking place at the computing device 102 based upon the current HID activity 106. In this regard, it is to be appreciated that the trained ML model 120 might be incorrect in its identification of the user activity taking place at a computing device 102. In some configurations, therefore, the ML model 120 can return data indicating the likelihood that a user activity, or activities, is taking place at the computing device 102. In this regard, therefore, it is to be appreciated that the phrase "identify user activity" and similar phrases encompass identifying a likelihood that a user activity is taking place. Additional details regarding the training of the ML model 120 using the labeled training data 112 will be provided below with regard to FIGS. 3 and 4.

The trained ML model 120 can be deployed to other computing devices, such as the computing devices 102C and 102D, by way of a network 118B, such as the internet. The trained ML model 120 can then be executed and receive data describing the HID activity 106C and 106D (e.g. keyboard or mouse movement) taking place at the devices 102C and 102D, respectively. The trained ML model 120 can then identify user activity currently taking place on the computing devices 102C and 102D based upon the observed HID activity 106C and 106D, respectively.

For example, and without limitation, the trained ML model 120 might determine that a user is utilizing a streaming video website/application or an email website/application executing on a computing device 102 based solely on the HID activity 106 taking place at the user's computing device 102. In this regard, it is to be appreciated that the ML model 120 can identify various other types of user activity taking place on a computing device 102 in various configurations. For example, and without limitation, the ML model 120 can identify other types of applications 110 that are being executed on the computing device 102 or websites that are being presented by a web browser application. The trained ML model 120 can also predict the type of activity that a user is engaged in (e.g. watching a movie, performing productivity tasks, using a social media website, or reviewing email) based upon the current HID activity 106. Other types of activities can be detected in other configurations.

Once the ML model 120 has identified a user activity taking place on a computing device 102, the ML model 120 (or another component) can then identify one or more features of the computing device 102, such as features provided by an OS 108 or applications 110 executing on the computing device 102, that are beneficial to the current user activity. As mentioned above, beneficial features include, but are not limited to, features that improve the performance of the user's computing device, improve the user interface provided by the computing device, enable the computing device to provide additional features, allow a user to work more efficiently or accurately, or that provide other types of benefits to the operation of the computing device. For example, and without limitation, if the ML model 120 determines that a user is watching a movie using a web browser that is known to demand more computing resources (e.g. processor cycles, memory, etc.) than other web browsers, the ML model 120 might identify a web browser that utilizes fewer computing resources. In another example, if the ML model 120 determines that a user is engaged in productivity-related activity late at night, the ML model 120 might identify a feature of the OS 108 for applying a blue light filter to the display output of the computing device.

It is to be appreciated that the ML model 120 can identify various features of a computing device 102 that are beneficial to the user activity taking place at the computing device 102 including, but not limited to, features provided by an operating system 108, features provided by applications 110 installed on the computing device 102, features provided by applications 110 not installed on the computing device 102 (e.g. network services), features provided by hardware components of the computing device 102, and features provided by websites or network services that can be accessed by the computing device 102. Other types of features can be identified in other configurations.

Once the ML model 120 has identified one or more features based upon the user activity currently being observed at a computing device 102, the ML model 120 can then cause a UI (not shown in FIG. 1) to be presented by the computing device 102 that describes the identified feature, or features, to a user of the computing device 102. In the first example given above, for instance, the UI might identify a web browser application that uses fewer computing resources when playing video files than the web browser application currently in use. In the second example given above, the UI might suggest turning on the blue light filter provided by the OS 108. The UI can also include UI controls which, when selected by the user, will initiate the identified feature or features.

In some configurations, the ML model 120 can cause one or more operational characteristics 122A and 122B, or parameters, of a computing device 102C and 102D, respectively, to be adjusted based upon the user activity taking place on the computing device 102 and the identified features, thereby saving computing resources. This occurs without user input in some configurations. For instance, in the second example given above, the ML model 120 might cause the blue light filter to be automatically applied without presentation of a UI to the user and without explicit user permission to initiate the feature. The user may, however, be provided with a UI for disabling a feature that has been automatically enabled.

The operational characteristics 122 of a computing device 102 that can be adjusted based upon the activity taking place on the computing device 102 can include, but are not limited to, executing applications 110, enabling features or otherwise modifying the operation of the OS 108 or applications 110 to conserve computing resources, initiating power management functionality to conserve computing resources, pre-loading or caching applications or data, or modifying other aspects of the operation of the computing device 102. Additional details regarding the use of the ML model 120 at runtime to identify user activity taking place on a computing device 102 based upon HID activity 106 will be provided below with regard to FIGS. 5 and 6.

Figure 2:
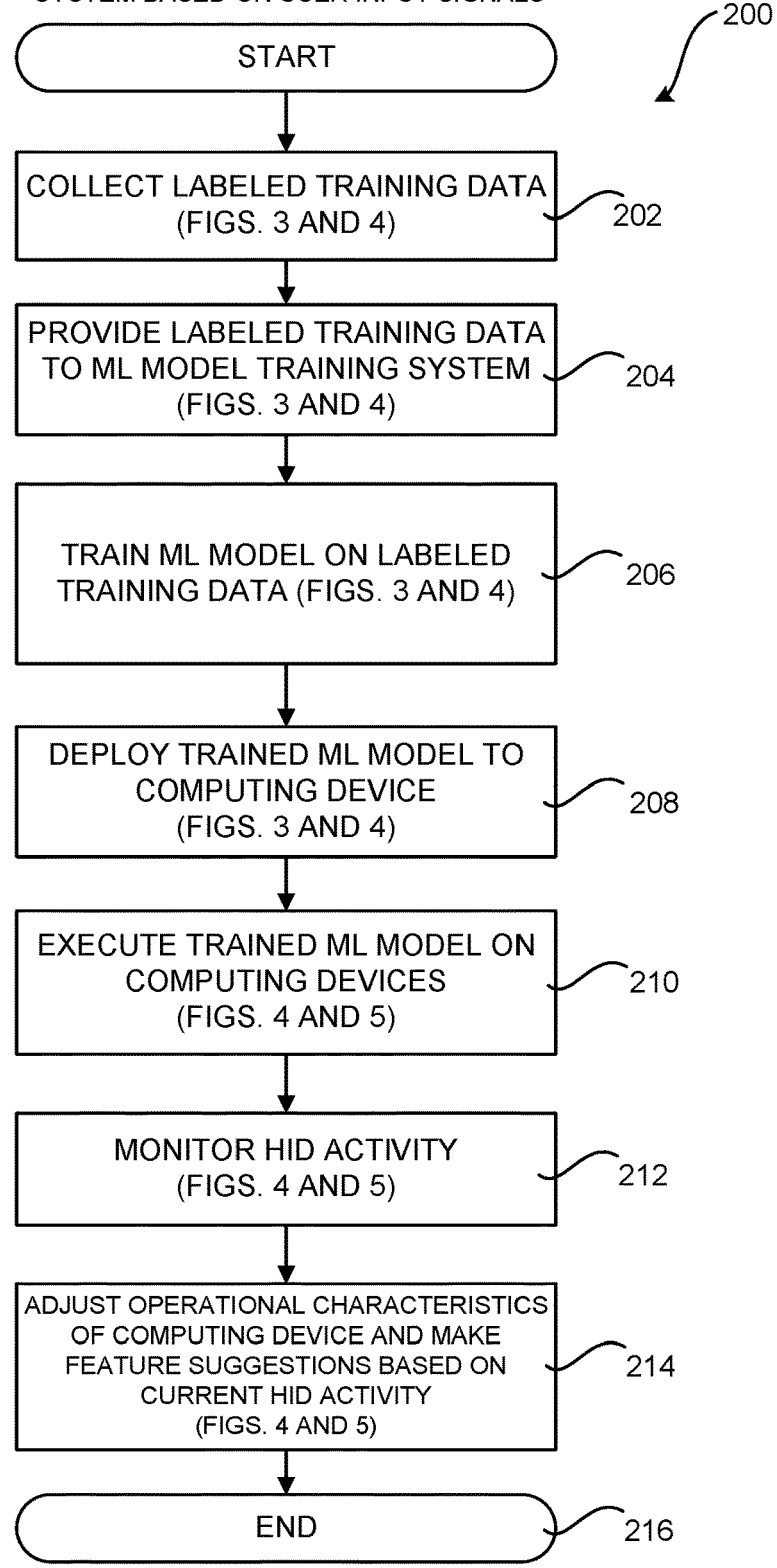
FIG. 2 is a flow diagram showing a routine that illustrates aspects of the operation of the computing devices shown in FIG. 1 for utilizing ML to adjust operational characteristics of a computing device based upon HID activity, according to one configuration disclosed herein.

FIG. 2 is a flow diagram showing a routine 200 that illustrates aspects of the operation of the computing devices shown in FIG. 1 for utilizing ML to adjust operational characteristics 122 of a computing device based upon current HID activity 106, according to one configuration disclosed herein. It should be appreciated that the logical operations described herein with regard to FIG. 2, and the other FIGS., can be implemented (1) as a sequence of computer implemented acts or program modules running on a computing system and/or (2) as interconnected machine logic circuits or circuit modules within the computing system.

The particular implementation of the technologies disclosed herein is a matter of choice dependent on the performance and other requirements of the computing system. Accordingly, the logical operations described herein are referred to variously as states, operations, structural devices, acts, or modules. These states, operations, structural devices, acts and modules can be implemented in software, in firmware, in special purpose digital logic, and any combination thereof. It should also be appreciated that more or fewer operations can be performed than shown in the FIGS. and described herein. These operations can also be performed in a different order than those described herein.

The routine 200 begins at operation 202, where the module 104 collects the labeled training data 112 in the manner described above. The module 104 then provides the labeled training data 112 to the ML model training system 114 at operation 204. At operation 206, the ML model training system 114 trains the ML model 120 using the labeled training data 112. The ML model 120 is then deployed to computing systems, such as the computing systems 102C and 102D in FIG. 1, at operation 208. Additional details regarding these operations will be provided below with regard to FIGS. 3 and 4.

From operation 208, the routine 200 proceeds to operation 210, where the ML model 120 executes on the computing devices 102. The ML model 120 receives data describing current HID activity 106 and determines, based upon the HID activity 106 currently taking place, the user activity currently taking place on the computing devices 102 at operation 212. As described above, the ML model 120 can also identify features of interest or operational characteristics 122 of the computing device based upon the identified user activity.

The routine 200 then proceeds to operation 214, where the ML model 120 can cause a UI suggesting the identified features to be presented to a user of the computing device 102. The user can then request additional information for the feature, that the feature be utilized, or dismiss the UI altogether. The ML model 120 might also cause operational characteristics 122 of the computing device 102 to be modified based upon the identified user activity. The routine 200 then continues from operation 214 to operation 216, where it ends. Alternatively, the routine 200 may continue by returning to operation 210, where additional features and operational characteristics 122 can be continually identified in the manner described above.

Figure 3:
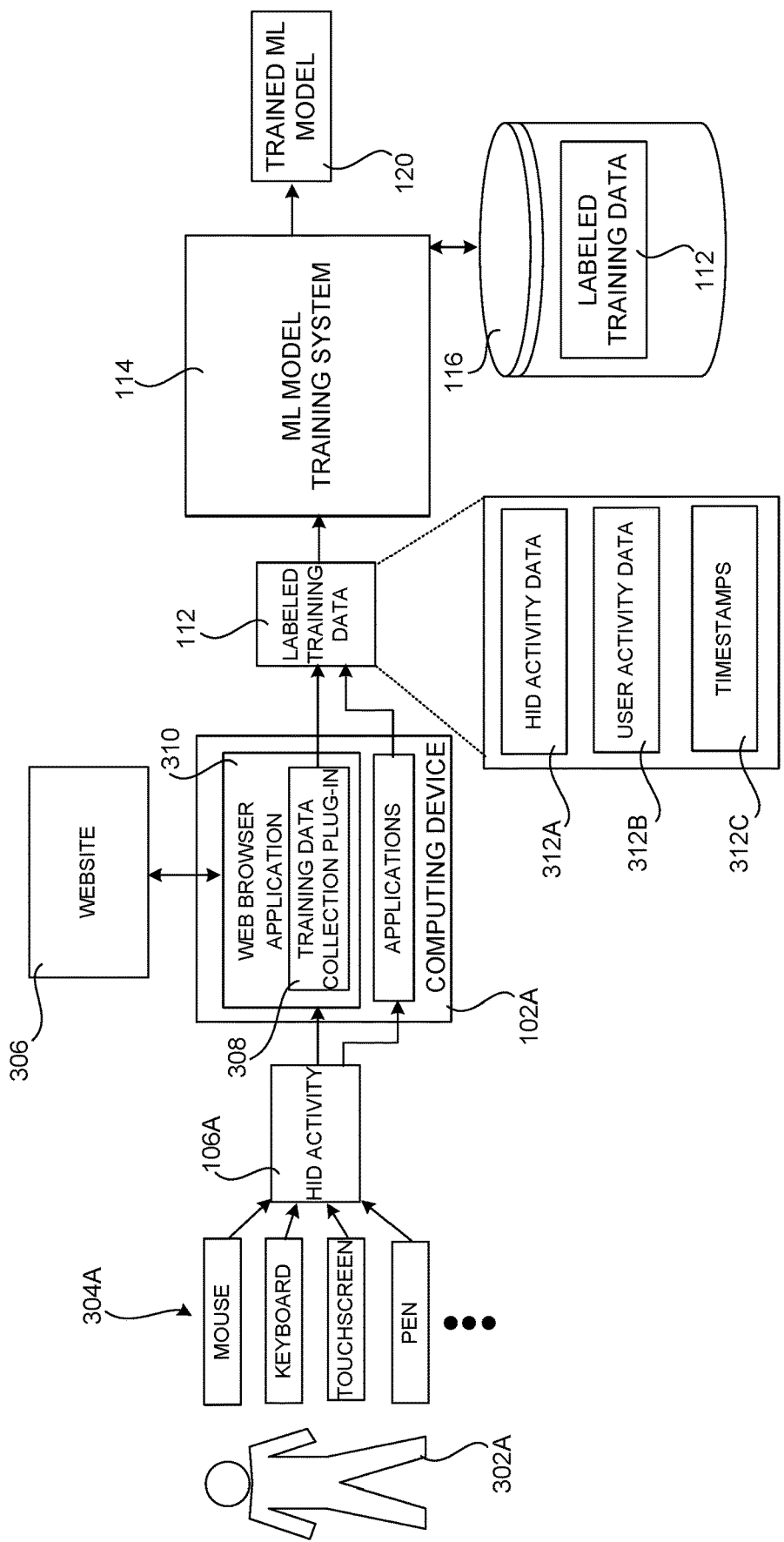
FIG. 3 is a network architecture diagram showing aspects of a system disclosed herein for training a ML model capable of adjusting operational characteristics of a computing device based upon HID activity, according to one particular configuration.

FIG. 3 is a network architecture diagram showing aspects of a particular configuration of a system disclosed herein for training a ML model 120 capable of adjusting operational characteristics 122 of a computing device 102 based upon HID activity 106A, according to one particular configuration. As shown in FIG. 3 and described briefly above, a user 302A can utilize one or more HIDs 304A to control a computing device 102A. As also discussed above, the HID activity data is collected by a training data collection module 104 in some configurations.

In the example shown in FIG. 3, the module 104 is a training data collection plug-in 308 (which might be referred to herein as a "web browser plug-in" or simply "a plug-in"). It is to be appreciated, however, that while the configurations described with reference to FIGS. 3 and 4 utilize a web browser plug-in to collect the user activity data, other types of applications 110 can collect the user activity data in other configurations. For example, an application 110 can collect the HID activity data and provide a UI through which a user can explicitly identify the type of user activity taking place. Collection of the user activity data in this manner can be performed by a limited group of users such as, but not limited to, compensated users such as users of a crowd-sourcing service. The disclosure presented herein is not, therefore, limited to use with a web browser plug-in to collect the HID activity data.

The plug-in 308 executes in conjunction with the web browser application 310 and collects the HID activity data. The plug-in 308 also collects data identifying activity taking place on the computing device 102A at the time the HID activity data was obtained. For example, and without limitation, the plug-in 308 can collect data indicating that the user 302A was utilizing a particular website 306 or application 110 (e.g. a productivity website/application, a streaming video website/application, or an email website/application) at the time the HID activity data was collected. As described above, the plug-in can collect data describing other types of activity taking place at the computing device 102 in other configurations.

The plug-in 308 then packages the data collected above as labeled training data 112 and provides the labeled training data 112 to the ML model training system 114. As shown in FIG. 3, the labeled training data 112 can include a field 312A including the HID activity data, a field 312B including data describing the user activity taking place at the computing device 102A at the time the HID activity data was collected, and a field 312C containing the timestamps indicating the time at which the HID activity data was collected. Other fields 312 can be included in other configurations.

As discussed above, the ML model training system 114 can store the labeled training data 112 in an appropriate data store 116 and utilize the labeled training data 112 to train the ML model 120. By training the ML model 120 using the labeled training data 112, the ML model 120 can be configured to receive data describing HID activity, such as the HID activity 106C and 106D received from user input devices connected to the computing devices 102C and 102D, respectively, and to identify user activity taking place on a computing device 102 based upon the HID activity 106. Additional details regarding the operation of the trained ML model 120 will be provided below with regard to FIGS. 5 and 6.

Figure 4:
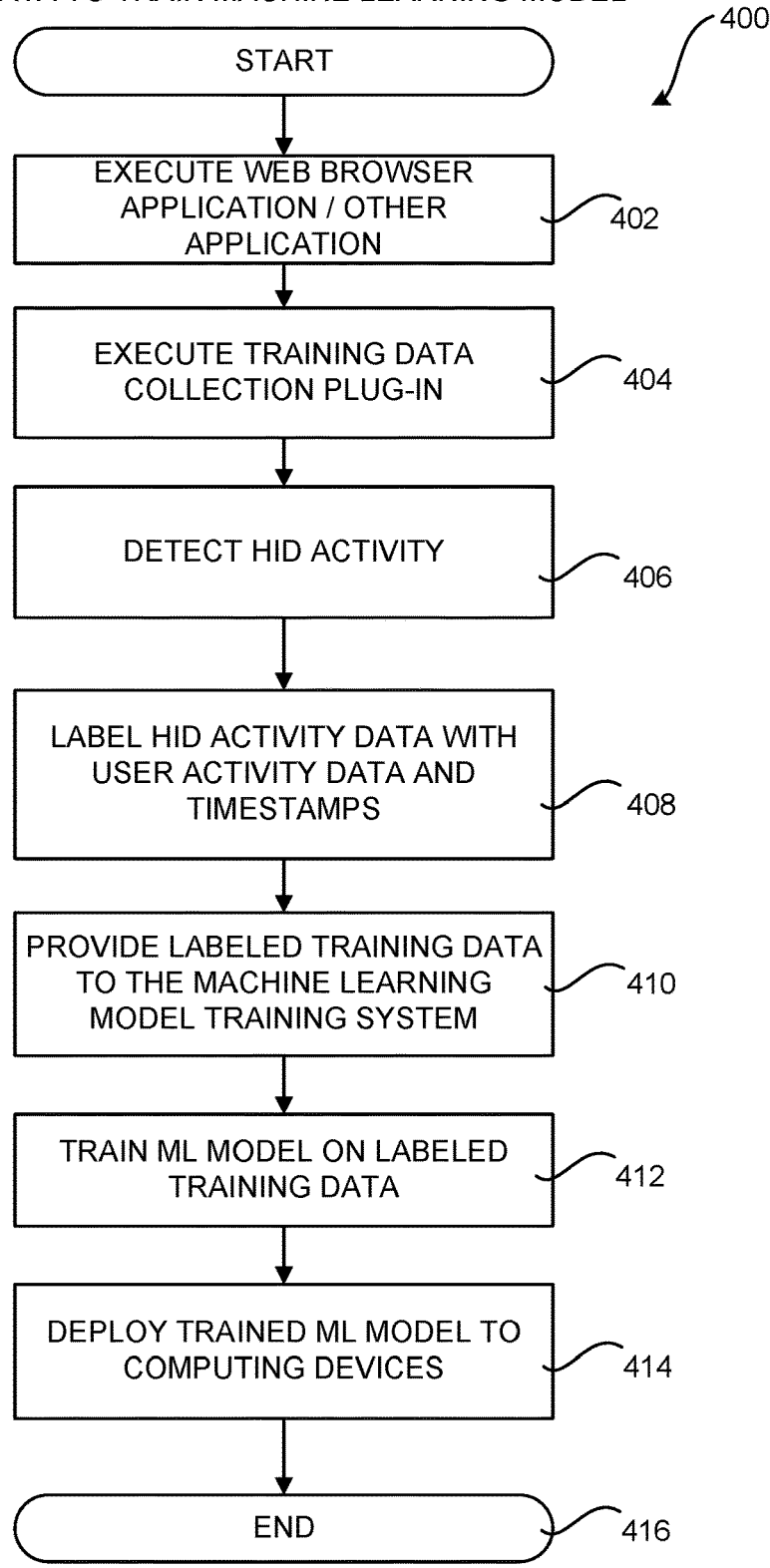
FIG. 4 is a flow diagram showing a routine that illustrates aspects of the operation of the computing devices shown in FIG. 3 for training a ML model capable of adjusting operational characteristics of a computing device based upon HID activity, according to one configuration disclosed herein.

FIG. 4 is a flow diagram showing a routine 400 that illustrates aspects of the operation of the computing devices shown in FIG. 3 for training a ML model 120 capable of recommending features and of adjusting operational characteristics 122 of a computing device 102 based upon HID activity 106, according to one configuration disclosed herein. The routine 400 begins at operation 402, where the web browser application 310 is executed on the computing device 102A. The routine 400 then proceeds from operation 402 to operation 404, where the plug-in 308 is executed in conjunction with the web browser application 310.

From operation 404, the routine 400 proceeds to operation 406, where the plug-in 308 receives the HID activity data. The routine 400 then proceeds to operation 408, where the plug-in 308 labels the HID activity data with the associated timestamp and with data identifying the user activity being performed at the computer 102A at the time the HID activity data was obtained. The plug-in 308 then provides the labeled training data 112 to the ML model training system 114 at operation 410.

At operation 412, the ML model training system 114 trains the ML model 120 using the labeled training data 112. Once the ML model 120 has been trained, the ML model 120 is deployed to one or more other computing devices 102, such as the computing devices 102C and 102D shown in FIG. 1 at operation 414. From operation 414, the routine 400 proceeds to operation 416, where it ends. Alternately, the routine 400 can proceed back to operation 402, where additional training data can be obtained and utilized to train the ML model 120 in the manner described above.

Figure 5:
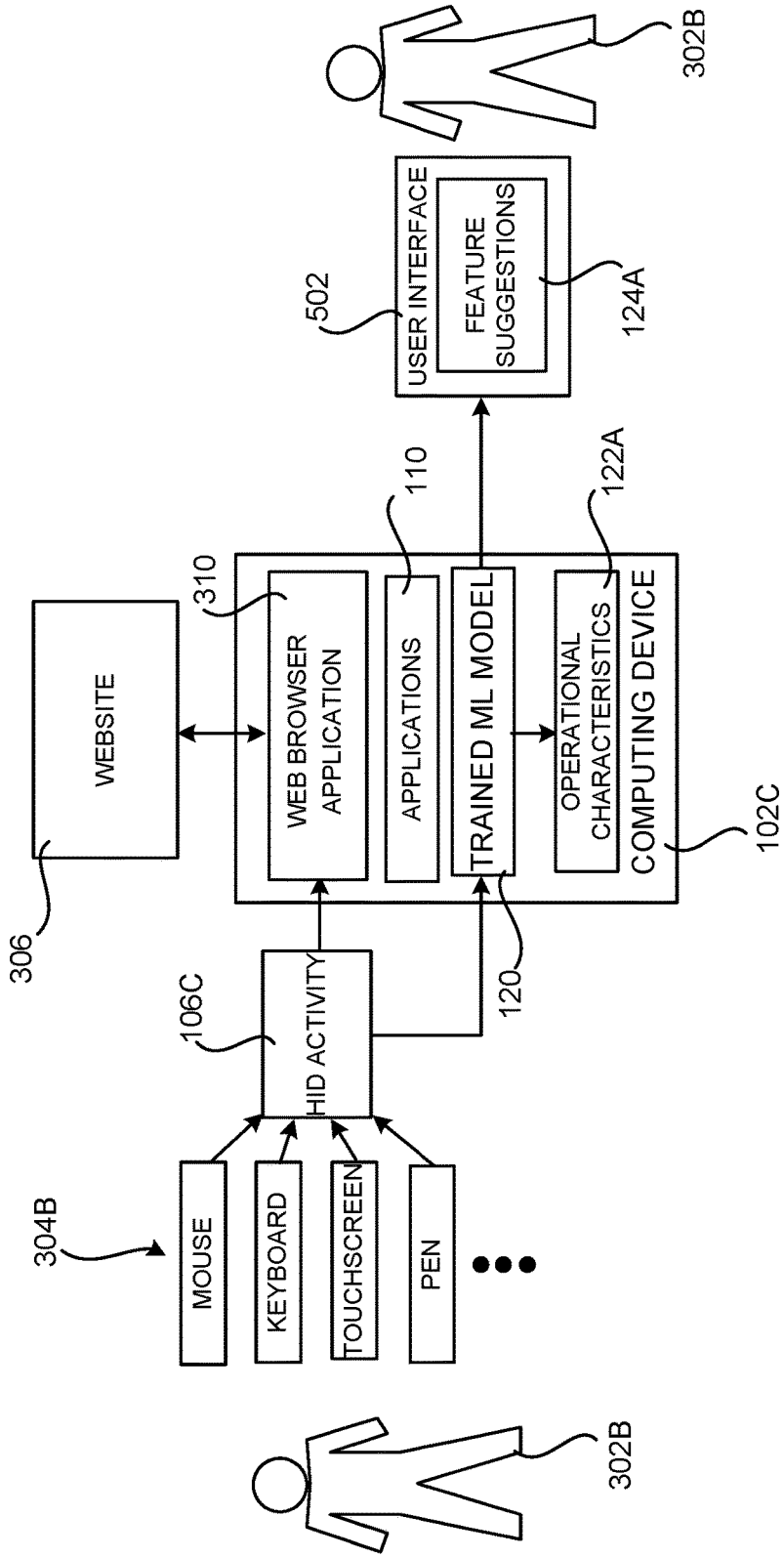
FIG. 5 is a network architecture diagram showing an overview of a system disclosed herein for executing a ML model to detect user activity at a computing device and to adjust operational characteristics of the computing device based upon the detected activity, according to one particular configuration.

FIG. 5 is a network architecture diagram showing an overview of a configuration of a particular system disclosed herein for executing a ML model 120 to detect user activity at a computing device 102C and to adjust operational characteristics 122A of the computing device 102C based upon the detected user activity, according to one particular configuration. As shown in FIG. 5, the trained ML model 120 can be executed on the computing device 102C and receive HID activity data that describes the activity of one or more HID devices 304B operated by a user 302B.

As discussed above, the executing ML model 120 utilizes the HID activity data to identify a user activity taking place at the computing device 102C. For example, and without limitation, the trained ML model 120 might determine that the user 302B is operating a web browser application 310 that is presenting a particular type of website 306. For example, and without limitation, the ML model 120 might determine that the user 302B is utilizing a streaming video website, an email service website, or another type of network-accessible site, in the web browser application 310 based on the HID activity data generated by use of the HID devices 304B. Similarly, the ML model 120 might determine that the user 302B is utilizing an application to stream video, an email application, or another type of application based on the HID activity data generated by use of the HID devices 304B

Once the trained ML model 120 has identified a user activity taking place on the computing device 102C, the ML model 120 (or another component) can then identify one or more features of the computing device 102C, such as features provided by an OS 108 or applications 110 executing on the computing device 102, that are beneficial to the identified user activity. In the example shown in FIG. 5, for instance, the ML model 120 might determine that the user 302B is utilizing the web browser application 310 to view a website 306 that provides streaming video. In other examples, the ML model 120 might determine that the user 302B is using a website 306 that provides productivity, email, or social networking functionality based solely on the HID activity 106C. As discussed above, use of applications for streaming video, performing productivity tasks, and/or engaging in other types of user activity can be detected in a similar manner.

The ML model 120 can then identify various features of the computing device 102C that are beneficial to the identified user activity. In the example discussed above, for instance, the ML model 120 might determine that another application 110 provides better performance when utilized to view streaming video or perform another task. Similarly, the ML model 120 might determine that another application 110 provides better compatibility or additional functionality when utilizing, email, social networking, or other types of network services.

Once the trained ML model 120 has identified one or more features based upon the user activity currently being performed at the computing device 102C, the ML model 120 can then cause a UI 502 to be presented to the user 302B that includes feature suggestions 124A that describe the identified feature, or features. In the example given above, for instance, the feature suggestions 124A might identify an application 110 that uses fewer computing resources when playing streaming video than the application 110 currently being used by the user 302B.

As discussed above, the trained ML model 120 can also cause one or more operational characteristics 122A of the computing device 102C to be adjusted based upon the user activity taking place on the computing device 102C and the identified features. This occurs without user input in some configurations. For example, if a user is fully engaged with their computing device, performance characteristics of the device might be adjusted such as maximizing CPU performance. In another example, functionality for providing audio spatial enhancement might be enabled while a user is watching, or is between watching, videos. Other types of operational characteristics of the computing device 102C can be adjusted in other configurations.

In some configurations, the presence or absence of particular types of user activity can also cause certain types of notifications or other information shown to a user to be suppressed. For example, and without limitation, if the ML model 120 predicts that a user is actively engaged with their device, web browsers can be opened to a blank page rather than to a web site, communications applications can be muted (i.e. not shown to the user), email and/or other types of notifications can be muted, the UI 502 can be muted, or servicing notifications can be paused. Other types of activities that might distract a user can be suppressed in a similar manner. As another example, if the ML model 120 predicts that a user is not going to be using their device for a while, software updates or other types of maintenance tasks can be initiated. As yet another example, if the ML model 120 predicts that a user is about to end their work day, the UI 502 can be presented. In this manner, the UI 502 can be presented to a user at an appropriate time based upon their engagement with their device or lack thereof.

Figure 6:
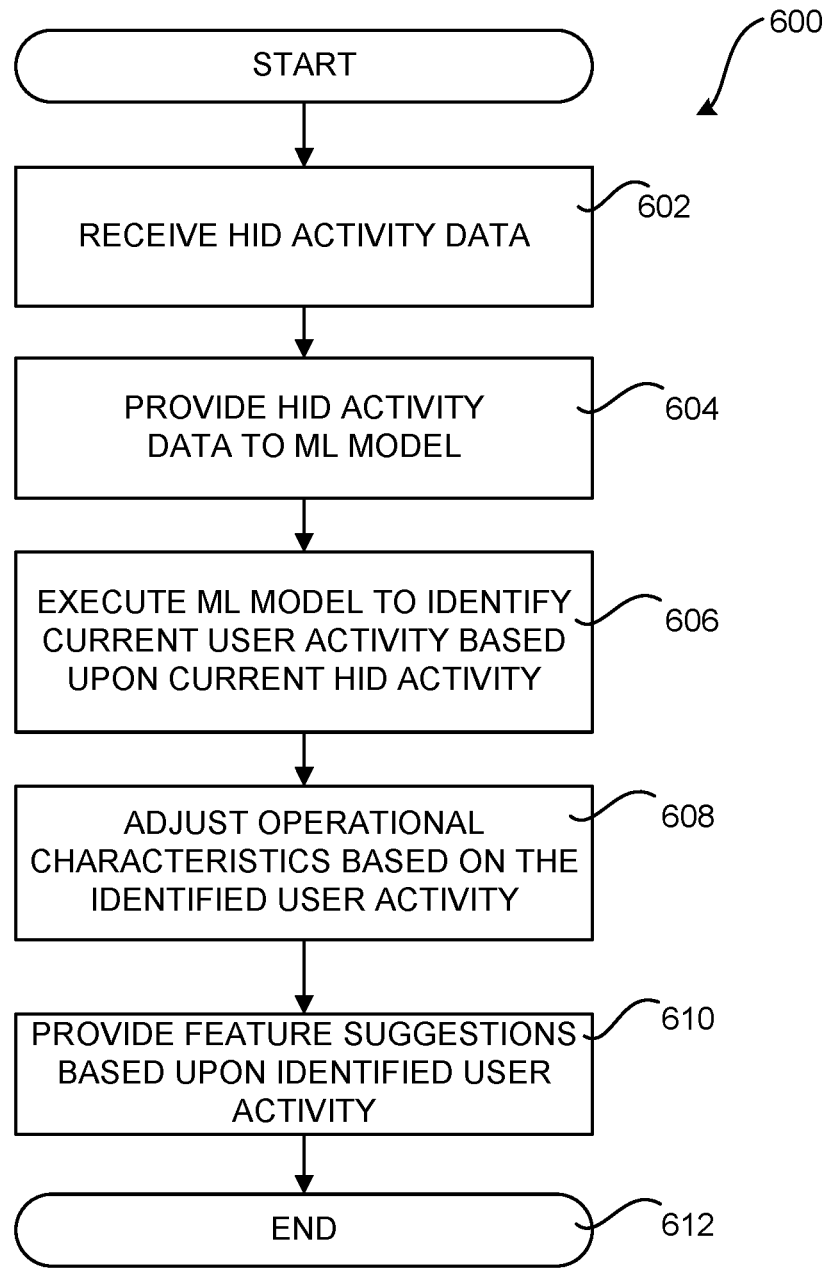
FIG. 6 is a flow diagram showing a routine that illustrates aspects of the operation of the computing devices shown in FIG. 5 for executing a ML model to detect user activity at a computing device and to adjust operational characteristics of the computing device based upon the detected activity, according to one configuration disclosed herein.

FIG. 6 is a flow diagram showing a routine 600 that illustrates aspects of the operation of the computing devices shown in FIG. 5 for executing a ML model 120 to detect user activity at a computing device 102 and to adjust operational characteristics 122 of the computing device 102 based upon the detected user activity, according to one configuration disclosed herein. The routine 600 begins at operation 602, where HID activity data is generated at the computing device 106C, such as by an operating system executing on the computing device 102C. The received HID activity data is then provided to the trained ML model 120 at operation 604.

From operation 604, the routine 600 proceeds to operation 606, where the ML model 120 is executed in order to identify a user activity, or activities, currently taking place on the computing device 102C based upon the current HID activity. The routine 600 then proceeds to operation 608, where one or more operational characteristics 122 of the computing device 102C can be adjusted based upon the identified user activity.

The routine 600 proceeds from operation 608 to operation 610, where the ML model 120 can cause feature suggestions 124A to be presented in a UI 502. As discussed above, the feature suggestions 124A are also selected based upon the user activity currently occurring on the computing device 102C. From operation 610, the routine 600 proceeds to operation 612, where it ends. Alternately, the routine 600 may proceed back to operation 602, where additional feature suggestions 124A can be made and where additional operational characteristics 122 of the computing device 102C may be adjusted.

Figure 7:
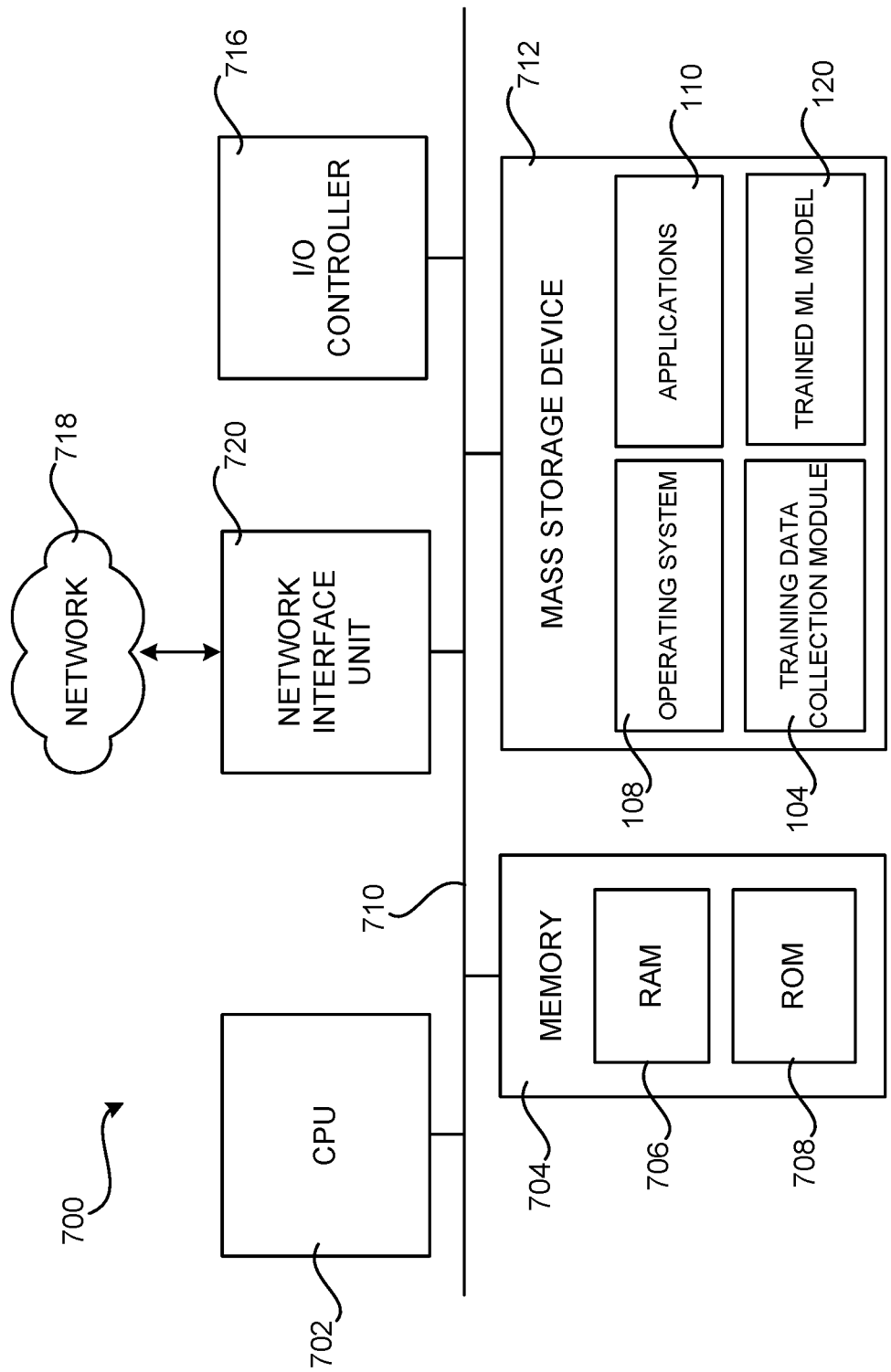
FIG. 7 is a computer architecture diagram illustrating an illustrative computer hardware and software architecture for a computing device, such as the computing devices shown in FIGS. 1, 3 and 5, that is capable of implementing aspects of the technologies presented herein.

FIG. 7 is a computer architecture diagram that shows an architecture for a computer 700 capable of executing the software components described herein. The architecture illustrated in FIG. 7 is an architecture for a server computer, mobile phone, an e-reader, a smart phone, a desktop computer, a netbook computer, a tablet computer, a laptop computer, or another type of computing device suitable for executing the software components presented herein.

In this regard, it should be appreciated that the computer 700 shown in FIG. 7 can be utilized to implement a computing device capable of executing any of the software components presented herein. For example, and without limitation, the computing architecture described with reference to FIG. 7 can be utilized to implement the computing devices 102A-102D, illustrated in FIG. 1 and described above, which are capable of executing the OS 108, the applications 110, the training data collection module 104, the trained ML model 120, and/or any of the other software components described above. The computing architecture described with reference to FIG. 7 can also be utilized to implement computing systems for implementing the ML model training system 114.

The computer 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system ("BIOS" or "firmware") containing the basic routines that help to transfer information between elements within the computer 700, such as during startup, is stored in the ROM 708. The computer 700 further includes a mass storage device 712 for storing an operating system 108 and one or more programs including, but not limited to, the applications 110, the training data collection module 104, and the trained ML model 120. The mass storage device 712 can also be configured to store other types of programs and data.

The mass storage device 712 is connected to the CPU 702 through a mass storage controller (not shown) connected to the bus 710. The mass storage device 712 and its associated computer readable media provide non-volatile storage for the computer 700. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 700. For purposes of the claims, the phrase "computer storage medium," and variations thereof, does not include waves or signals per se or communication media.

According to various configurations, the computer 700 can operate in a networked environment using logical connections to remote computers through a network such as the network 718. The computer 700 can connect to the network 718 through a network interface unit 720 connected to the bus 710. It should be appreciated that the network interface unit 720 can also be utilized to connect to other types of networks and remote computer systems. The computer 700 can also include an input/output controller 716 for receiving and processing input from a number of other devices, including a keyboard, mouse, touch input, or electronic stylus (not shown in FIG. 7). Similarly, the input/output controller 716 can provide output to a display screen, a printer, or other type of output device (also not shown in FIG. 7).

It should be appreciated that the software components described herein, such as the applications 110, the training data collection module 104, and the trained ML model 120, when loaded into the CPU 702 and executed, can transform the CPU 702 and the overall computer 700 from a general-purpose computing system into a special-purpose computing system customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the architecture shown in FIG. 7 for the computer 700, or a similar architecture, can be utilized to implement other types of computing devices, including hand-held computers, embedded computer systems, mobile devices such as smartphones and tablets, and other types of computing devices known to those skilled in the art. It is also contemplated that the computer 700 might not include all of the components shown in FIG. 7, can include other components that are not explicitly shown in FIG. 7, or can utilize an architecture completely different than that shown in FIG. 7.

Figure 8:
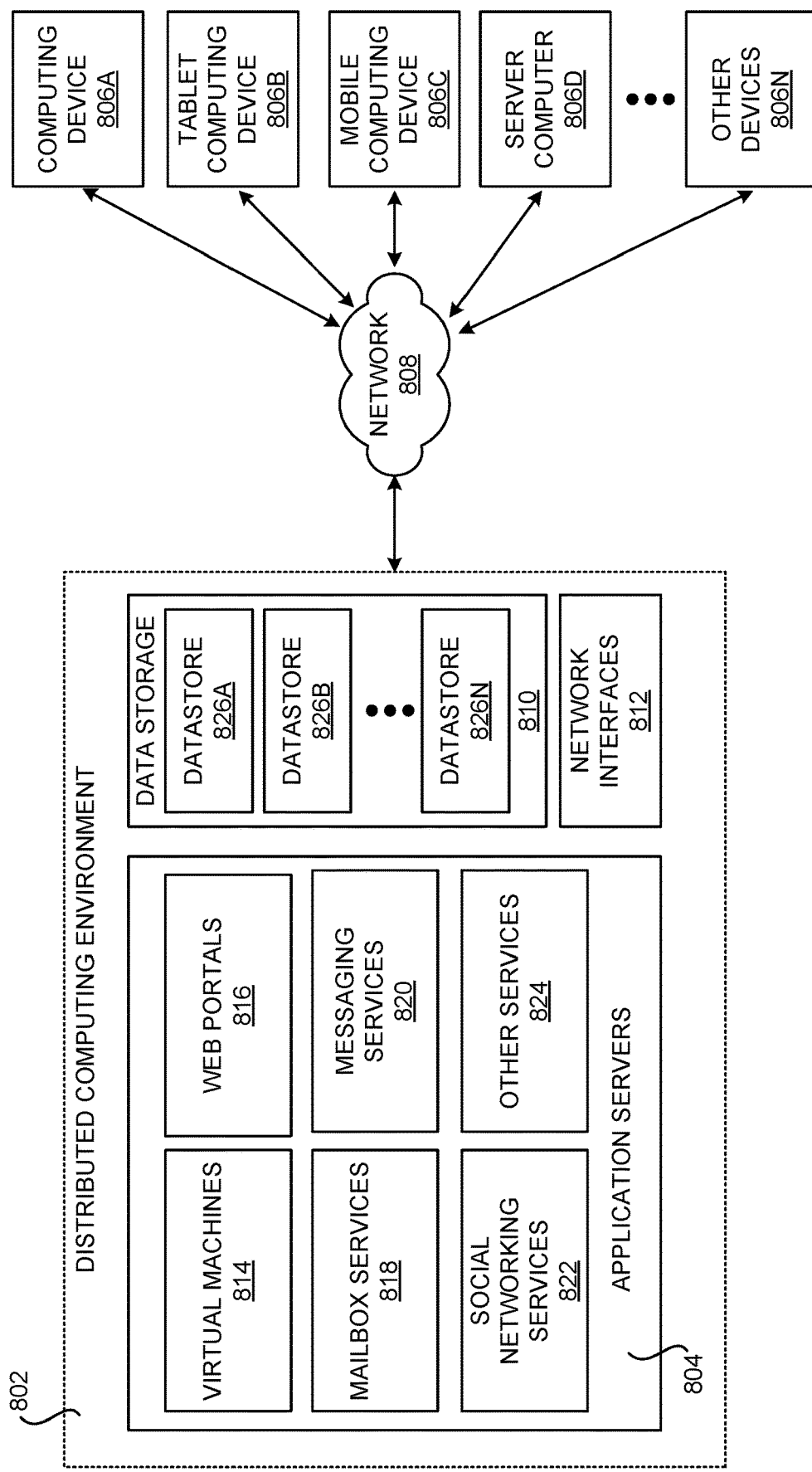
FIG. 8 is a network diagram illustrating a distributed computing environment capable of implementing aspects of the technologies presented herein.

FIG. 8 shows aspects of an illustrative distributed computing environment 802 in which the software components described herein can be executed. Thus, the distributed computing environment 802 illustrated in FIG. 8 can be used to execute program code, such as applications 110, the training data collection module 104, and the trained ML model 120, capable of providing the functionality described herein with respect to FIGS. 1-6, and/or any of the other software components described herein.

According to various implementations, the distributed computing environment 802 operates on, in communication with, or as part of a network 804. One or more client devices 806A-806N (hereinafter referred to collectively and/or generically as "devices 806") can communicate with the distributed computing environment 802 via the network 804 and/or other connections (not illustrated in FIG. 8).

In the illustrated configuration, the devices 806 include: a computing device 806A such as a laptop computer, a desktop computer, or other computing device; a "slate" or tablet computing device ("tablet computing device") 806B; a mobile computing device 806C such as a mobile telephone, a smart phone, or other mobile computing device; a server computer 806D; and/or other devices 806N. It should be understood that any number of devices 806 can communicate with the distributed computing environment 802. Two example computing architectures for the devices 806 are illustrated and described herein with reference to FIGS. 7 and 9. It should be understood that the illustrated clients 806 and computing architectures illustrated and described herein are illustrative, and should not be construed as being limited in any way.

In the illustrated configuration, the distributed computing environment 802 includes application servers 804, data storage 810, and one or more network interfaces 812. According to various implementations, the functionality of the application servers 804 can be provided by one or more server computers that are executing as part of, or in communication with, the network 808. The application servers 804 can host various services such as virtual machines, portals, and/or other resources. In the illustrated configuration, the application servers 804 host one or more virtual machines 814 for hosting applications, such as program components for implementing the ML model training system 114, or other functionality. It should be understood that this configuration is illustrative, and should not be construed as being limiting in any way. The application servers 804 might also host or provide access to one or more web portals, link pages, websites, and/or other information ("web portals") 816.

According to various implementations, the application servers 804 also include one or more mailbox services 818 and one or more messaging services 820. The mailbox services 818 can include electronic mail ("email") services. The mailbox services 818 can also include various personal information management ("PIM") services including, but not limited to, calendar services, contact management services, collaboration services, and/or other services. The messaging services 820 can include, but are not limited to, instant messaging ("IM") services, chat services, forum services, and/or other communication services.

The application servers 804 can also include one or more social networking services 822. The social networking services 822 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 822 are provided by or include the FACEBOOK social networking service, the LINKEDIN professional networking service, the FOURSQUARE geographic networking service, and the like. In other configurations, the social networking services 822 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 822 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 822 are not mentioned herein for the sake of brevity. As such, the configurations described above are illustrative, and should not be construed as being limited in any way.

As also shown in FIG. 8, the application servers 804 can also host other services, applications, portals, and/or other resources ("other services") 824. These services can include, but are not limited to, streaming video services like the NETFLIX streaming video service and productivity services such as the GMAIL email service from GOOGLE INC. It thus can be appreciated that activities performed by users of the distributed computing environment 802 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 802 can include data storage 810. According to various implementations, the functionality of the data storage 810 is provided by one or more databases operating on, or in communication with, the network 808. The functionality of the data storage 810 can also be provided by one or more server computers configured to host data for the distributed computing environment 802. The data storage 810 can include, host, or provide one or more real or virtual datastores 826A-826N (hereinafter referred to collectively and/or generically as "datastores 826"). The datastores 826 are configured to host data used or created by the application servers 804 and/or other data.

The distributed computing environment 802 can communicate with, or be accessed by, the network interfaces 812. The network interfaces 812 can include various types of network hardware and software for supporting communications between two or more computing devices including, but not limited to, the devices 806 and the application servers 804. It should be appreciated that the network interfaces 812 can also be utilized to connect to other types of networks and/or computer systems.

It should be understood that the distributed computing environment 802 described herein can implement any aspects of the software elements described herein with any number of virtual computing resources and/or other distributed computing functionality that can be configured to execute any aspects of the software components disclosed herein. It should be understood that the devices 806 can also include real or virtual machines including, but not limited to, server computers, web servers, personal computers, mobile computing devices, smart phones, and/or other devices. As such, various implementations of the technologies disclosed herein enable any device configured to access the distributed computing environment 802 to utilize the functionality described herein.

Figure 9:
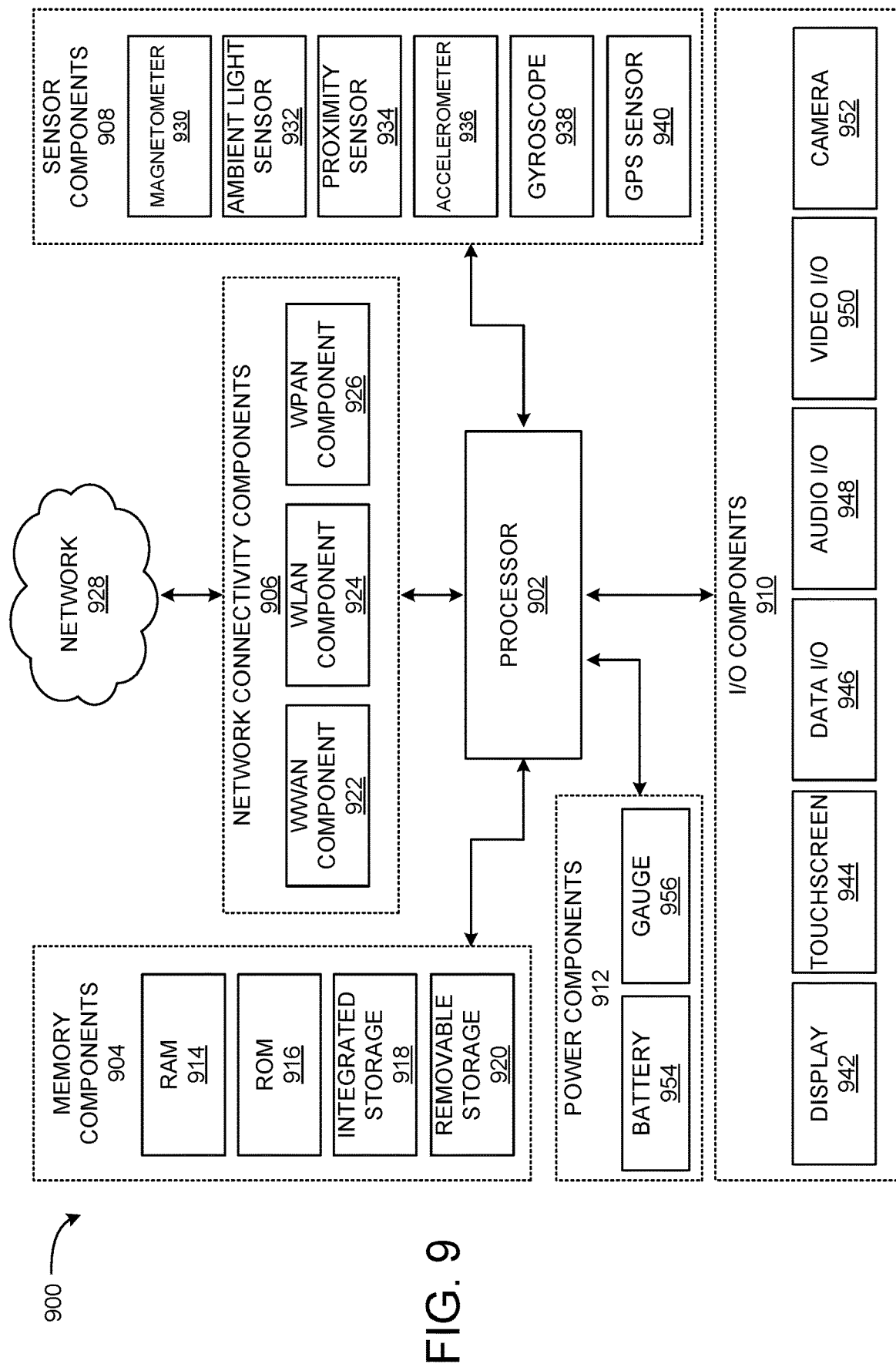
FIG. 9 is a computer architecture diagram illustrating a computing device architecture for a computing device, such as the computing devices shown in FIGS. 1, 3, and 5, that is capable of implementing aspects of the technologies presented herein.

Turning now to FIG. 9, an illustrative computing device architecture 900 will be described for a computing device, such as the computing devices 102, that is capable of executing the various software components described herein. The computing device architecture 900 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 900 is also applicable to any of the devices 806 shown in FIG. 8. Furthermore, aspects of the computing device architecture 900 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, or tablet computer devices that utilize a touchscreen or some other touch-enabled device, such as a touch-enabled track pad or touch-enabled mouse. The computing device architecture 900 can also be utilized to implement the computing devices 102, and/or other types of computing devices for implementing or consuming the functionality described herein.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can be connected electrically in order to interact and carry out device functions. In some configurations, the components are arranged so as to communicate via one or more busses (not shown).

The processor 902 includes one or more CPU cores configured to process data, execute computer-executable instructions of one or more application programs and to communicate with other components of the computing device architecture 900 in order to perform various functionality described herein. The processor 902 can be utilized to execute aspects of the software components presented herein and, particularly, those that utilize, at least in part, a touch-enabled input.

In some configurations, the processor 902 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 902 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 902 is, or is included in, a system-on-chip ("SoC") along with one or more of the other components described herein below. For example, the SoC can include the processor 902, a GPU, one or more of the network connectivity components 906, and one or more of the sensor components 908. In some configurations, the processor 902 is fabricated, in part, utilizing a package-on-package ("PoP") integrated circuit packaging technique. Moreover, the processor 902 can be a single core or multi-core processor.

The processor 902 can be created in accordance with an ARM architecture, available for license from ARM HOLDINGS of Cambridge, United Kingdom. Alternatively, the processor 902 can be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a RAM 914, a ROM 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 or the removable storage 920.

The integrated storage 918 can include a solid-state memory, a hard disk, or a combination of solid-state memory and a hard disk. The integrated storage 918 can be soldered or otherwise connected to a logic board upon which the processor 902 and other components described herein might also be connected. As such, the integrated storage 918 is integrated in the computing device. The integrated storage 918 can be configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available and shown to a user as a total combined capacity of the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from a network 928, which can be a WWAN, a WLAN, or a WPAN. Although a single network 928 is illustrated, the network connectivity components 906 can facilitate simultaneous communication with multiple networks. For example, the network connectivity components 906 can facilitate simultaneous communications with multiple networks via one or more of a WWAN, a WLAN, or a WPAN.

The network 928 can be a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 928 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 928 can be configured to provide voice and/or data communications with any combination of the above technologies. The network 928 can be configured or adapted to provide voice and/or data communications in accordance with future generation technologies.

In some configurations, the WWAN component 922 is configured to provide dual- multi-mode connectivity to the network 928. For example, the WWAN component 922 can be configured to provide connectivity to the network 928, wherein the network 928 provides service via GSM and UMTS technologies, or via some other combination of technologies. Alternatively, multiple WWAN components 922 can be utilized to perform such functionality, and/or provide additional functionality to support other non-compatible technologies (i.e., incapable of being supported by a single WWAN component). The WWAN component 922 can facilitate similar connectivity to multiple networks (e.g., a UMTS network and an LTE network).

The network 928 can be a WLAN operating in accordance with one or more Institute of Electrical and Electronic Engineers ("IEEE") 104.11 standards, such as IEEE 104.11a, 104.11, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 928 via the WI-FI access points. Such connections can be secured via various encryption technologies including, but not limited, WI-FI Protected Access ("WPA"), WPA2, Wired Equivalent Privacy ("WEP"), and the like.

The network 928 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 930, an ambient light sensor 932, a proximity sensor 934, an accelerometer 936, a gyroscope 938, and a Global Positioning System sensor ("GPS sensor") 940. It is contemplated that other sensors, such as, but not limited to, temperature sensors or shock detection sensors, might also be incorporated in the computing device architecture 900.

The magnetometer 930 is configured to measure the strength and direction of a magnetic field. In some configurations, the magnetometer 930 provides measurements to a compass application program stored within one of the memory components 904 in order to provide a user with accurate directions in a frame of reference including the cardinal directions, north, south, east, and west. Similar measurements can be provided to a navigation application program that includes a compass component. Other uses of measurements obtained by the magnetometer 930 are contemplated.

The ambient light sensor 932 is configured to measure ambient light. In some configurations, the ambient light sensor 932 provides measurements to an application program stored within one the memory components 904 in order to automatically adjust the brightness of a display (described below) to compensate for low light and bright light environments. Other uses of measurements obtained by the ambient light sensor 932 are contemplated.

The proximity sensor 934 is configured to detect the presence of an object or thing in proximity to the computing device without direct contact. In some configurations, the proximity sensor 934 detects the presence of a user's body (e.g., the user's face) and provides this information to an application program stored within one of the memory components 904 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 934 are contemplated.

The accelerometer 936 is configured to measure proper acceleration. In some configurations, output from the accelerometer 936 is used by an application program as an input mechanism to control some functionality of the application program. In some configurations, output from the accelerometer 936 is provided to an application program for use in switching between landscape and portrait modes, calculating coordinate acceleration, or detecting a fall. Other uses of the accelerometer 936 are contemplated.

The gyroscope 938 is configured to measure and maintain orientation. In some configurations, output from the gyroscope 938 is used by an application program as an input mechanism to control some functionality of the application program. For example, the gyroscope 938 can be used for accurate recognition of movement within a 3D environment of a video game application or some other application. In some configurations, an application program utilizes output from the gyroscope 938 and the accelerometer 936 to enhance control of some functionality of the group conversation application client 102. Other uses of the gyroscope 938 are contemplated.

The GPS sensor 940 is configured to receive signals from GPS satellites for use in calculating a location. The location calculated by the GPS sensor 940 can be used by any application program that requires or benefits from location information. For example, the location calculated by the GPS sensor 940 can be used with a navigation application program to provide directions from the location to a destination or directions from the destination to the location. Moreover, the GPS sensor 940 can be used to provide location information to an external location-based service, such as E911 service. The GPS sensor 940 can obtain location information generated via WI-FI, WIMAX, and/or cellular triangulation techniques utilizing one or more of the network connectivity components 906 to aid the GPS sensor 940 in obtaining a location fix. The GPS sensor 940 can also be used in Assisted GPS ("A-GPS") systems.

The I/O components 910 include a display 942, a touchscreen 944, a data I/O interface component ("data I/O") 946, an audio I/O interface component ("audio I/O") 948, a video I/O interface component ("video I/O") 950, and a camera 952. In some configurations, the display 942 and the touchscreen 944 are combined. In some configurations two or more of the data I/O component 946, the audio I/O component 948, and the video I/O component 950 are combined. The I/O components 910 can include discrete processors configured to support the various interfaces described below, or might include processing functionality built-in to the processor 902.

The display 942 is an output device configured to present information in a visual form. In particular, the display 942 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 942 is a liquid crystal display ("LCD") utilizing any active or passive matrix technology and any backlighting technology (if used). In some configurations, the display 942 is an organic light emitting diode ("OLED") display. Other display types are contemplated.

The touchscreen 944 is an input device configured to detect the presence and location of a touch. The touchscreen 944 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 944 is incorporated on top of the display 942 as a transparent layer to enable a user to use one or more touches to interact with objects or other information presented on the display 942. In other configurations, the touchscreen 944 is a touch pad incorporated on a surface of the computing device that does not include the display 942. For example, the computing device can have a touchscreen incorporated on top of the display 942 and a touch pad on a surface opposite the display 942.

In some configurations, the touchscreen 944 is a single-touch touchscreen. In other configurations, the touchscreen 944 is a multi-touch touchscreen. In some configurations, the touchscreen 944 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 944. As such, a developer can create gestures that are specific to a particular application program.

In some configurations, the touchscreen 944 supports a tap gesture in which a user taps the touchscreen 944 once on an item presented on the display 942. The tap gesture can be used for various reasons including, but not limited to, opening or launching whatever the user taps, such as a graphical icon representing the group conversation application client 102. In some configurations, the touchscreen 944 supports a double tap gesture in which a user taps the touchscreen 944 twice on an item presented on the display 942. The double tap gesture can be used for various reasons including, but not limited to, zooming in or zooming out in stages. In some configurations, the touchscreen 944 supports a tap and hold gesture in which a user taps the touchscreen 944 and maintains contact for at least a pre-defined time. The tap and hold gesture can be used for various reasons including, but not limited to, opening a context-specific menu.

In some configurations, the touchscreen 944 supports a pan gesture in which a user places a finger on the touchscreen 944 and maintains contact with the touchscreen 944 while moving the finger on the touchscreen 944. The pan gesture can be used for various reasons including, but not limited to, moving through screens, images, or menus at a controlled rate. Multiple finger pan gestures are also contemplated. In some configurations, the touchscreen 944 supports a flick gesture in which a user swipes a finger in the direction the user wants the screen to move. The flick gesture can be used for various reasons including, but not limited to, scrolling horizontally or vertically through menus or pages. In some configurations, the touchscreen 944 supports a pinch and stretch gesture in which a user makes a pinching motion with two fingers (e.g., thumb and forefinger) on the touchscreen 944 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 944. As such, the above gestures should be understood as being illustrative and should not be construed as being limiting in any way.

The data I/O interface component 946 is configured to facilitate input of data to the computing device and output of data from the computing device. In some configurations, the data I/O interface component 946 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 948 is configured to provide audio input and/or output capabilities to the computing device. In some configurations, the audio I/O interface component 948 includes a microphone configured to collect audio signals. In some configurations, the audio I/O interface component 948 includes a headphone jack configured to provide connectivity for headphones or other external speakers. In some configurations, the audio interface component 948 includes a speaker for the output of audio signals. In some configurations, the audio I/O interface component 948 includes an optical audio cable out.

The video I/O interface component 950 is configured to provide video input and/or output capabilities to the computing device. In some configurations, the video I/O interface component 950 includes a video connector configured to receive video as input from another device (e.g., a video media player such as a DVD or BLU-RAY player) or send video as output to another device (e.g., a monitor, a television, or some other external display). In some configurations, the video I/O interface component 950 includes a High-Definition Multimedia Interface ("HDMI"), mini-HDMI, micro-HDMI, DisplayPort, or proprietary connector to input/output video content. In some configurations, the video I/O interface component 950 or portions thereof is combined with the audio I/O interface component 948 or portions thereof.

The camera 952 can be configured to capture still images and/or video. The camera 952 can utilize a charge coupled device ("CCD") or a complementary metal oxide semiconductor ("CMOS") image sensor to capture images. In some configurations, the camera 952 includes a flash to aid in taking pictures in low-light environments. Settings for the camera 952 can be implemented as hardware or software buttons.

Although not illustrated, one or more hardware buttons can also be included in the computing device architecture 900. The hardware buttons can be used for controlling some operational aspect of the computing device. The hardware buttons can be dedicated buttons or multi-use buttons. The hardware buttons can be mechanical or sensor-based.

The illustrated power components 912 include one or more batteries 954, which can be connected to a battery gauge 956. The batteries 954 can be rechargeable or disposable. Rechargeable battery types include, but are not limited to, lithium polymer, lithium ion, nickel cadmium, and nickel metal hydride. Each of the batteries 954 can be made of one or more cells.

The battery gauge 956 can be configured to measure battery parameters such as current, voltage, and temperature. In some configurations, the battery gauge 956 is configured to measure the effect of a battery's discharge rate, temperature, age and other factors to predict remaining life within a certain percentage of error. In some configurations, the battery gauge 956 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 912 can also include a power connector (not shown), which can be combined with one or more of the aforementioned I/O components 910. The power components 912 can interface with an external power system or charging equipment via a power I/O component 910. Other configurations can also be utilized.

The disclosure presented herein also encompasses the subject matter set forth in the following clauses:

Clause 1. A computer-implemented method, comprising: receiving labeled training data (112) comprising data (312A) describing human interface device (HID) activity (106A) at a first computing device (102A), and data (312B) identifying user activity occurring at the first computing device (102A) when the HID activity (106A) took place at the first computing device; training a machine learning model (120) using the labeled training data (112); and deploying the machine learning model (120) to a second computing device (102C), the machine learning model (120) configured to receive data describing HID activity (106C) at the second computing device (102C), identify user activity occurring at the second computing device (102C) based upon the data describing the HID activity (106C) at the second computing device (102C), and cause a user interface (UI) (502) to be presented at the second computing device (102C), the UI (502) identifying one or more features of the second computing device (102C), the one or more features selected based upon the identified user activity occurring at the second computing device (102C).

Clause 2. The computer-implemented method of clause 1, wherein the machine learning model is further configured to cause an operational characteristic of the second computing device to be adjusted based upon the identified user activity.

Clause 3. The computer-implemented method of clauses 1 or 2, wherein the machine learning model is further configured to cause an operational characteristic of the second computing device to be adjusted based upon an absence of user activity.

Clause 4. The computer-implemented method of any of clauses 1-3, wherein the labeled training data further comprises timestamps identifying time periods during which the HID activity at the first computing device took place.

Clause 5. The computer-implemented method of any of clauses 1-4, wherein the machine learning model is trained using Boosted Decision Trees.

Clause 6. The computer-implemented method of any of clauses 1-5, wherein the data identifying the user activity occurring at the first computing device when the HID activity took place at the first computing device is obtained by an application executing on the first computing device.

Clause 7. The computer-implemented method of any of clauses 1-6, application comprises a web browser plug-in executing within a web browser application executing on the first computing device, and wherein the data identifying the user activity occurring at the first computing device identifies a website presented by the web browser application.

Clause 8. An apparatus (102C), comprising: one or more processors (902); a display (942); one or human interface devices (HIDs) (304); and at least one computer storage medium (904) having computer executable instructions stored thereon which, when executed by the one or more processors (902), cause the apparatus to receive data describing HID activity (106C) at the apparatus (102C), execute a machine learning model to identify a user activity occurring at the apparatus (102C) based upon the data describing the HID activity (106C) at the apparatus (102C), and cause a user interface (UI) (502) to be presented on the display (942), the UI (502) identifying one or more features of the apparatus (102C) selected based upon the identified user activity occurring at the apparatus (102C).

Clause 9. The apparatus of clause 8, wherein the at least one computer storage medium stores further computer executable instructions which, when executed by the one or more processors, adjust an operational characteristic of the apparatus selected based upon the identified user activity.

Clause 10. The apparatus of clauses 8 or 9, wherein the machine learning model is further configured to cause an operational characteristic of the second computing device to be adjusted based upon an absence of user activity.

Clause 11. The apparatus of any of clauses 8-10, wherein the machine learning model is trained with labeled training data comprising data describing HID activity at a computing device and data identifying user activity occurring at the computing device when the HID activity occurred.

Clause 12. The apparatus of any of clauses 8-11, wherein the labeled training data further comprises timestamps identifying a time period during which the HID activity occurred.

Clause 13. The apparatus of any of clauses 8-12, wherein the data describing the HID activity is obtained by a web browser plug-in executing within a web browser application executing on the computing device, and wherein the data identifying user activity occurring at the computing device identifies a website presented by the web browser application.

Clause 14. The apparatus of any of clauses 8-13, wherein the machine learning model is trained using Boosted Decision Trees.

Clause 15. At least one computer storage medium (904) having computer executable instructions stored thereon which, when executed by one or more processors (902) of a first computing device (102C), cause the first computing device (102C) to: detect HID activity (106C) at the first computing device (102C); execute a machine learning model (120) to identify a user activity taking place at the first computing device (102C) based upon the HID activity (106C) at the first computing device (102C); and cause a user interface (UI) (502) to be presented by the first computing device (102C), the UI (502) identifying one or more features of the first computing device (102C), the features of the first computing device (102C) being selected based upon the identified user activity.

Clause 16. The at least one computer storage medium of clause 15, storing further computer executable instructions which, when executed by the one or more processors, adjust an operational characteristic of the first computing device, the operational characteristic being selected based upon the identified user activity.

Clause 17. The at least one computer storage medium of clauses 15 or 16, wherein the machine learning model is further configured to cause an operational characteristic of the second computing device to be adjusted based upon an absence of user activity.

Clause 18. The at least one computer storage medium of any of clauses 15-17, wherein the machine learning model is trained with labeled training data comprising data identifying HID activity at a second computing device and data identifying user activity occurring during a period of time that the HID activity occurred at the second computing device.

Clause 19. The at least one computer storage medium of any of clauses 15-18, wherein the data identifying user activity occurring during a period of time that the HID activity occurred at the second computing device is obtained by a web browser plug-in executing within a web browser application executing on the second computing device, and wherein the data identifying HID activity at the second computing device identifies a website presented by the web browser application.

Clause 20. The at least one computer storage medium of any of clauses 15-19, wherein the machine learning model is trained using Boosted Decision Trees.

Based on the foregoing, it should be appreciated that various technologies for utilizing ML to adjust operational characteristics of a computing system based upon HID activity have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
receiving labeled training data comprising:
data describing human interface device (HID) activity at a computing device, and
data identifying user activity occurring at the computing device when the HID activity took place at the computing device, wherein the activity occurring at the computing device is associated with an application installed on the computing device;
training a machine learning model using the labeled training data; and
deploying the machine learning model, the machine learning model configured to:
receive additional data describing HID activity,
identify additional user activity based upon the additional data describing the HID activity, and
cause a user interface (UI) to be presented at the computing device, the UI identifying one or more operating system features of the computing device that improve operational performance of the computing device, the one or more operating system features selected based upon the identified additional user activity occurring at the computing device.

2. The computer-implemented method of claim 1, wherein the machine learning model is further configured to cause an operational characteristic of the computing device to be adjusted based upon the identified user activity.

3. The computer-implemented method of claim 1, wherein the machine learning model is further configured to cause an operational characteristic of the computing device to be adjusted based upon an absence of user activity.

4. The computer-implemented method of claim 1, wherein the labeled training data further comprises timestamps identifying time periods during which the HID activity at the computing device took place.

5. The computer-implemented method of claim 1, wherein the machine learning model is trained using Boosted Decision Trees.

6. The computer-implemented method of claim 1, wherein the data identifying the user activity occurring at the computing device when the HID activity took place at the computing device is obtained by an application executing on the computing device.

7. The computer-implemented method of claim 6, wherein the application comprises a web browser plug-in executing within a web browser application executing on the computing device, and wherein the data identifying the user activity occurring at the computing device identifies a website presented by the web browser application.

8. An apparatus, comprising:
one or more processors;
a display;
one or human interface devices (HIDs); and
at least one computer storage medium having computer executable instructions stored thereon which, when executed by the one or more processors, cause the apparatus to:
receive data describing HID activity at the apparatus, wherein the activity occurring at the apparatus is associated with an application installed on the apparatus,
execute a machine learning model to identify a user activity occurring at the apparatus based upon the data describing the HID activity at the apparatus, and
cause a user interface (UI) to be presented on the display, the UI identifying one or more operating system features of the apparatus that improve operational performance of the apparatus, the one or more operation system features selected based upon the identified user activity occurring at the apparatus;
wherein the machine learning model is trained using labeled training data comprising:
data describing HID activity at the apparatus, and
data identifying user activity occurring at the apparatus when the HID activity took place at the apparatus.

9. The apparatus of claim 8, wherein the at least one computer storage medium stores further computer executable instructions which, when executed by the one or more processors, adjust an operational characteristic of the apparatus selected based upon the identified user activity.

10. The apparatus of claim 8, wherein the machine learning model is further configured to cause an operational characteristic of the apparatus to be adjusted based upon an absence of user activity.

11. The apparatus of claim 8, wherein the labeled training data further comprises timestamps identifying a time period during which the HID activity occurred.

12. The apparatus of claim 8, wherein the data describing the HID activity is obtained by a web browser plug-in executing within a web browser application executing on the apparatus, and wherein the data identifying user activity occurring at the apparatus identifies a website presented by the web browser application.

13. The apparatus of claim 8, wherein the machine learning model is trained using Boosted Decision Trees.

14. At least one computer storage medium having computer executable instructions stored thereon which, when executed by one or more processors of a computing device, cause the computing device to:
detect HID activity at the computing device, wherein the activity occurring at the computing device is associated with an application installed on the computing device;
execute a machine learning model to identify a user activity taking place at the computing device based upon the HID activity at the computing device; and
cause a user interface (UI) to be presented by the computing device, the UI identifying one or more operating system features of the computing device that improve operational performance of the computing device, the operating system features of the computing device being selected based upon the identified user activity;
wherein the machine learning model is trained using labeled training data comprising:
data describing HID activity at the computing device, and
data identifying user activity occurring at the computing device when the HID activity took place at the computing device.

15. The at least one computer storage medium of claim 14, storing further computer executable instructions which, when executed by the one or more processors, adjust an operational characteristic of the computing device, the operational characteristic being selected based upon the identified user activity.

16. The at least one computer storage medium of claim 14, wherein the machine learning model is further configured to cause an operational characteristic of the computing device to be adjusted based upon an absence of user activity.

17. The at least one computer storage medium of claim 14, wherein the data identifying user activity occurring during a period of time that the HID activity occurred at the computing device is obtained by a web browser plug-in executing within a web browser application executing on the computing device, and wherein the data identifying HID activity at the computing device identifies a website presented by the web browser application.

18. The at least one computer storage medium of claim 14, wherein the machine learning model is trained using Boosted Decision Trees.

* * * * *